(12) United States Patent
Apel et al.

(10) Patent No.: US 7,640,829 B2
(45) Date of Patent: Jan. 5, 2010

(54) DRIVE UNIT FOR A MOTOR VEHICLE

(75) Inventors: Christian Apel, Weissach (DE);
Matthias Kraemer, Moensheim (DE);
Dieter Kraxner, Wurmberg (DE);
Joachim Esser, Rutesheim (DE); Klaus Tiede, Sachsenheim (DE); Ralph-Maria Netzker, Ludwigsburg (DE); Robert Fuchs, Wiernsheim (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 544 days.

(21) Appl. No.: 11/370,836

(22) Filed: Mar. 9, 2006

(65) Prior Publication Data

US 2006/0204374 A1 Sep. 14, 2006

(30) Foreign Application Priority Data

Mar. 11, 2005 (DE) .................. 10 2005 011 321

(51) Int. Cl.
*F16H 57/02* (2006.01)
(52) U.S. Cl. .................................................. 74/606 R
(58) Field of Classification Search ............... 74/606 R, 74/607, 606 A; 475/230; 123/195 R
See application file for complete search history.

(56) References Cited

U.S. PATENT DOCUMENTS 3,052,313 A 9/1962 Hooven
3,213,968 A 10/1965 Muller

FOREIGN PATENT DOCUMENTS

| DE | 33 23 626 C2 | 1/1985 |
| DE | 39 20 638 A1 | 12/1989 |
| DE | 40 19 765 A1 | 1/1992 |
| DE | 199 26 422 A1 | 12/2000 |
| EP | 0 473 202 A1 | 3/1992 |
| JP | 01266021 A * | 10/1989 |
| JP | 03-118221 A | 5/1991 |

OTHER PUBLICATIONS

European Search Report dated Jun. 30, 2006 with an English translation of the pertinent portions (Eight (8) pages).

* cited by examiner

*Primary Examiner*—Vicky A Johnson
(74) *Attorney, Agent, or Firm*—RatnerPrestia

(57) ABSTRACT

A drive unit for a motor vehicle, having an engine unit and an axle differential arranged on the engine unit, as well as having drive shafts for the vehicle wheels disposed at least partially in the crankcase. The separating plane between the crankcase bottom part and the oil bearing housing of the crankcase acts as the bearing for at least one drive shaft.

6 Claims, 5 Drawing Sheets

DRIVE UNIT FOR A MOTOR VEHICLE

This application claims the priority of DE 10 2005 011 321.4, filed Mar. 11, 2005, the disclosure of which is expressly incorporated by reference herein.

BACKGROUND AND SUMMARY OF THE INVENTION

The present invention relates to a drive unit for a motor vehicle having an engine unit and an axle differential arranged on the latter, as well as having drive shafts for vehicle wheels disposed at least partially in the crankcase.

DE 33 23 626 C2 shows a drive unit in which the drive shaft penetrating an oil pan of the internal-combustion engine is disposed in the crankcase on one side and on or in the oil pan on the other side. This arrangement permits a compact construction of the drive unit so that, when there is sufficient ground clearance, a lifting of the vehicle body is not required.

An object of the present invention to further improve the structural rigidity of such a drive unit for absorbing the dynamic forces in the case of a simultaneously deep installation position of the engine unit in the vehicle, so that a flat overall frontal geometry can be achieved with a low center of gravity of the vehicle.

This object has been achieved by providing that a separating plane between the crankcase bottom part and the oil bearing housing of the crankcase is provided as the bearing for at least one drive shaft.

As a result of the fact that the separating plane between a crankcase bottom half and an oil bearing housing of the engine unit is provided as a bearing plane for the drive shaft, on the one hand, the weight of the engine unit or of the drive unit as well as the dynamic forces occurring during the operation can be reliably absorbed and, on the other hand, because of the installation position for the drive shaft, a deep installation position can be achieved for the engine unit.

The differential gear or axle differential has a housing which is simultaneously provided as a fastening point or bearing point for the engine at the vehicle member or the vehicle body.

One of the two drive shafts is additionally supported on the side of the crankcase opposite the axle differential by a bearing console screwed to the crankcase. This advantageously increases the stiffness of the bearing unit for the drive shaft.

Other objects, advantages and novel features of the present invention will become apparent from the following detailed description of the invention when considered in conjunction with the accompanying drawings.

DETAILED DESCRIPTION OF THE DRAWINGS

Figure 1:
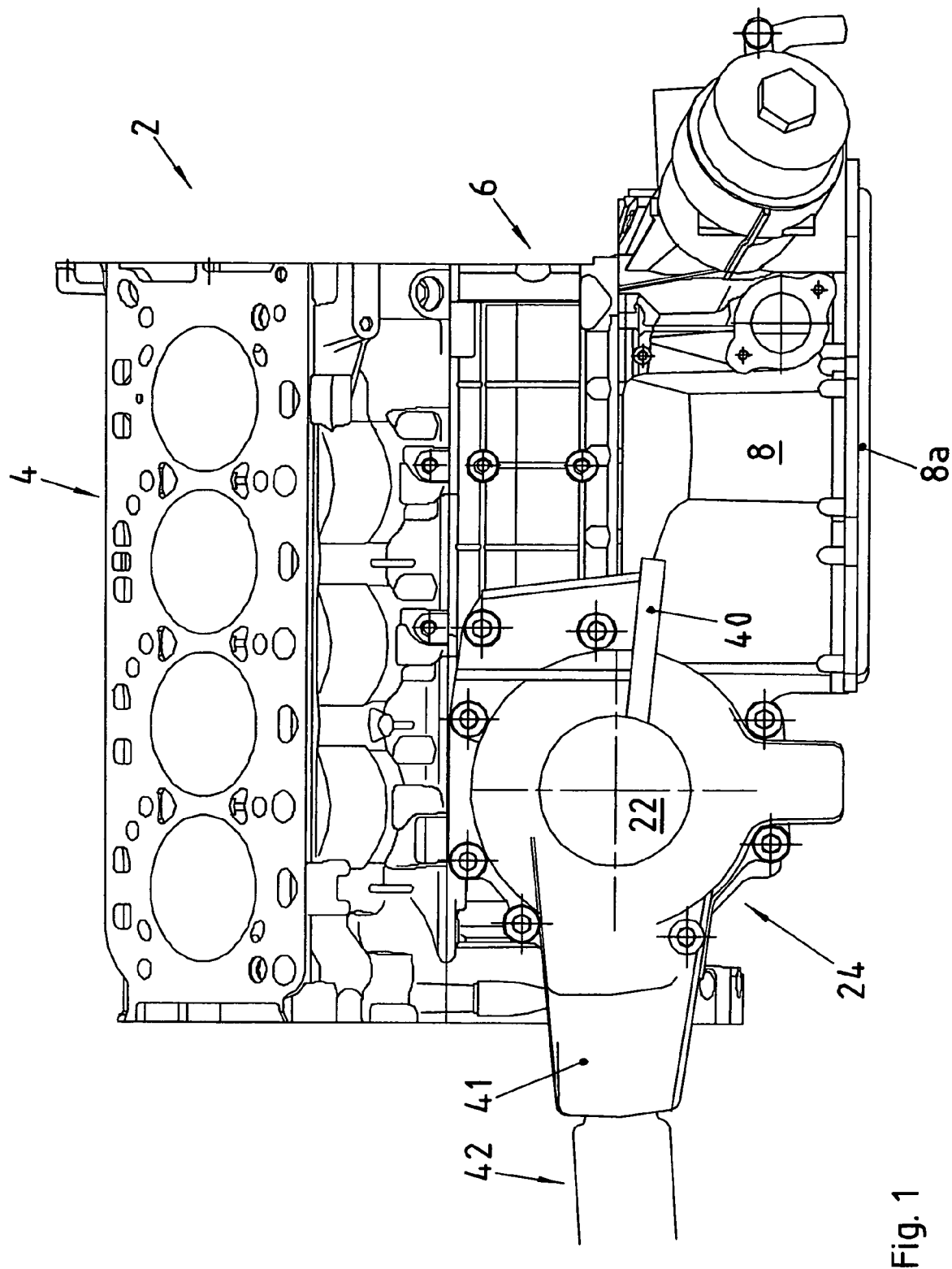
FIG. 1 is a side elevational view of an engine unit with a flanged-on axle differential housing.
Figure 3:
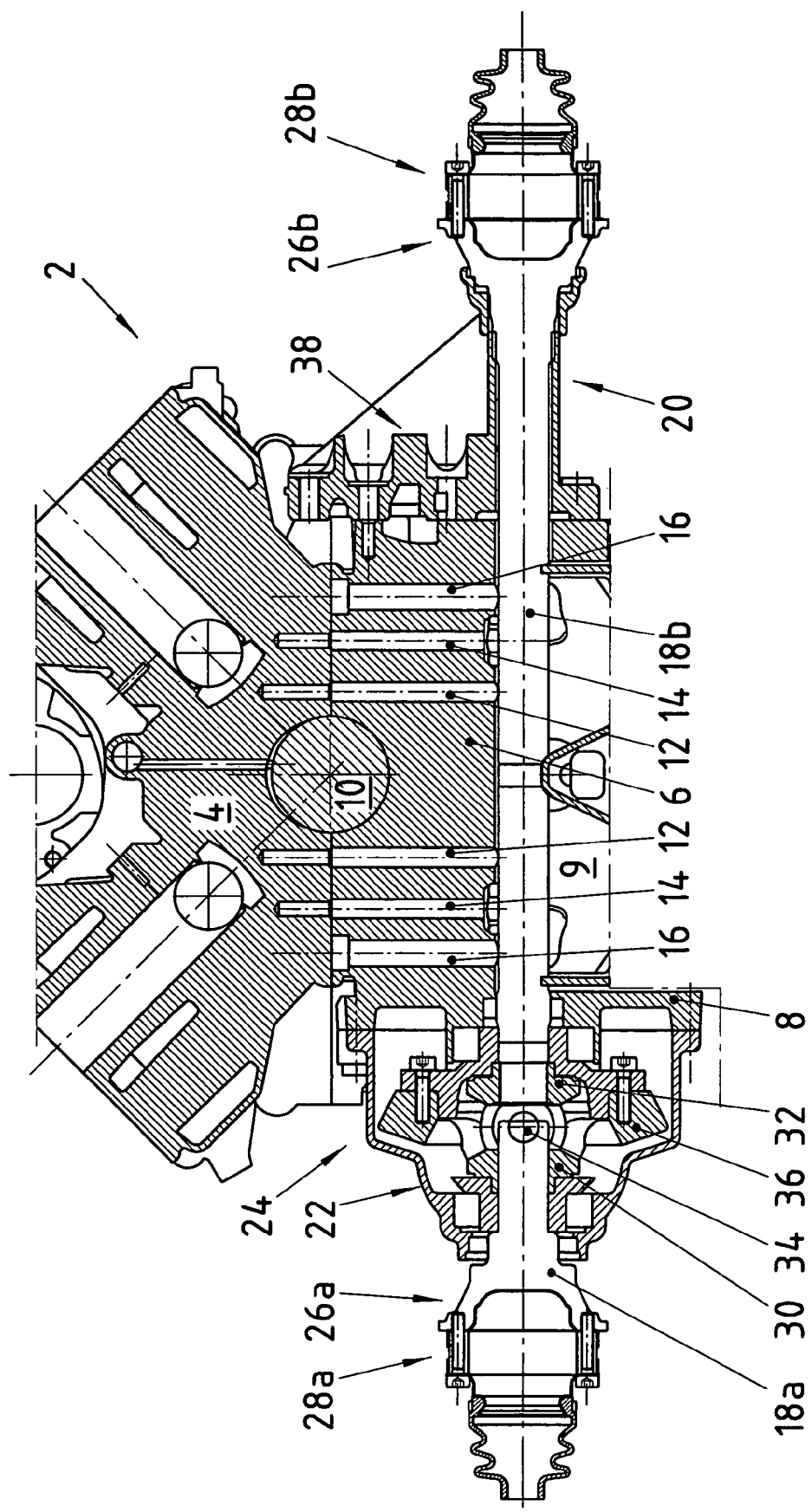
FIG. 3 is a cross-sectional view of the engine unit shown in FIG. 1 in the area of the drive shafts.

FIG. 1 shows a V-8 engine having a crankcase 2 which essentially consists of a crankcase top half 4, a crankcase bottom half 6 and an adjoining oil bearing housing 8. An oil collecting space 9 is constructed in the oil bearing housing 8 and is closed off toward the bottom by an oil pan cover 8a. As illustrated best in FIGS. 1 and 3, the cylinder faces are integrated in the crankcase top part 4. The respective main bearing halves for the crankshaft 10 are integrated in the separating plane between the crankcase top half and bottom half 4, 6. An inner and outer screwed main bearing connection 12, 14 is provided for screwing the crankcase bottom half 6 to the crankcase top half 4. The outer screwed main bearing connection 14—as illustrated in FIG. 3—is adjoined by oil return ducts 16 toward the outside for returning the lubricating oil from the cylinder head into the oil sump constructed in the oil bearing housing 8.

Figure 5:
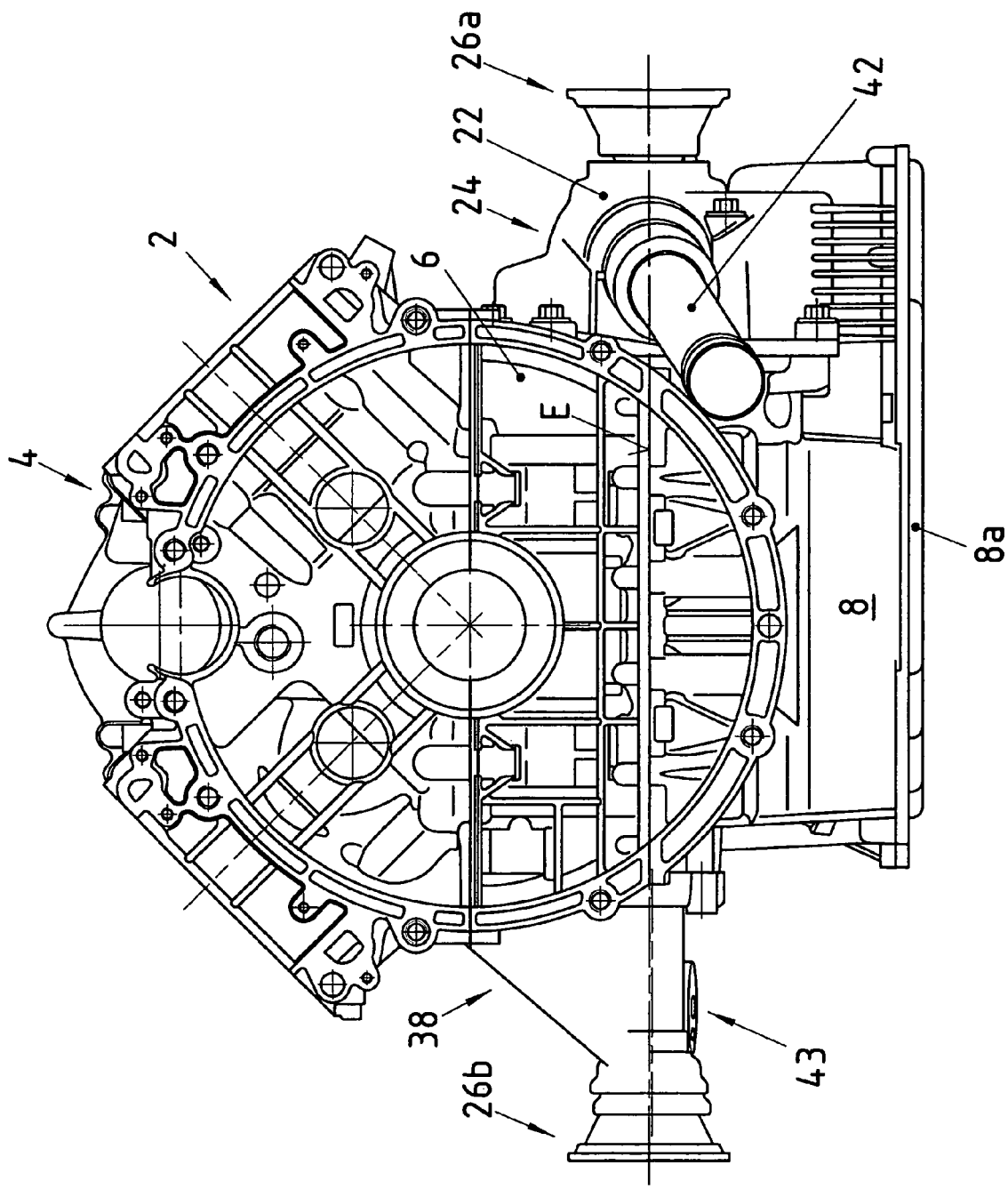
FIG. 5 is a second frontal view of the engine unit.

Two drive shafts 18a, 18b of a front-axle drive 20 extend in the separating plane (see, for example, FIGS. 3 and 5) between the crankcase bottom half 6 and the oil bearing housing 8. The drive shaft 18b on the right, as shown in FIG. 3, is disposed completely in the parting plane E between the crankcase bottom part 6 and the oil bearing housing 8. The left drive shaft 18a is disposed in a housing 22 of an axle differential 24 which is fastened laterally to the oil bearing housing 8 and the crankcase bottom half 6.

Figure 2:
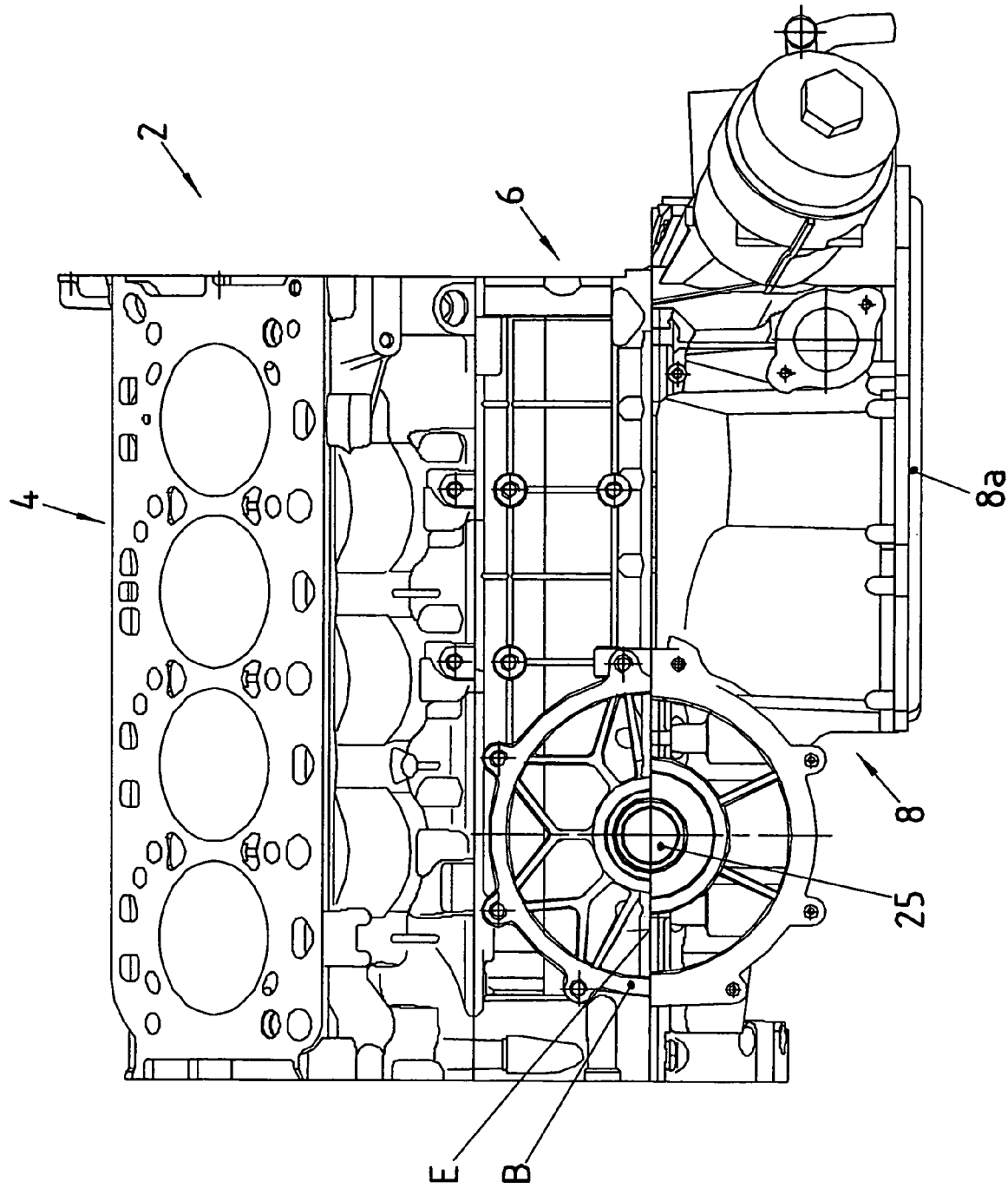
FIG. 2 is a side elevational view of the engine unit similar to FIG. 1, but without an axle differential housing.

FIG. 2 shows the fastening flange B for the housing 22 of the axial differential 24 which is of semicircular construction in each case on the crankcase bottom half 6 and on the oil bearing housing 8. The right drive shaft 18b is guided through the opening 25. One flange 26a, 26b, respectively (FIG. 3) is constructed at the two outer ends of the drive shafts 18a, 18b, on which flanges 26a, 26b, propeller shafts 28a, 28b are fastened which lead to the vehicle wheels. An axle shaft gearwheel 30, 32, respectively is fastened at the other ends of the drive shafts 18a, 18b, to mesh two differential bevel gears (not shown), disposed on an axle bolt 34 constructed in one or several parts. Furthermore, the ring gear 36 is received in the housing 22 of the axle differential 24 and is driven in a known manner by way of a bevel drive pinion (not shown).

A bearing consol 38 is provided on the side of the crankcase 2 situated opposite the axle differential 24 for the bearing of the right drive shaft 18b and is fastened to the crankcase bottom part 6 and top half 4.

Figure 4:
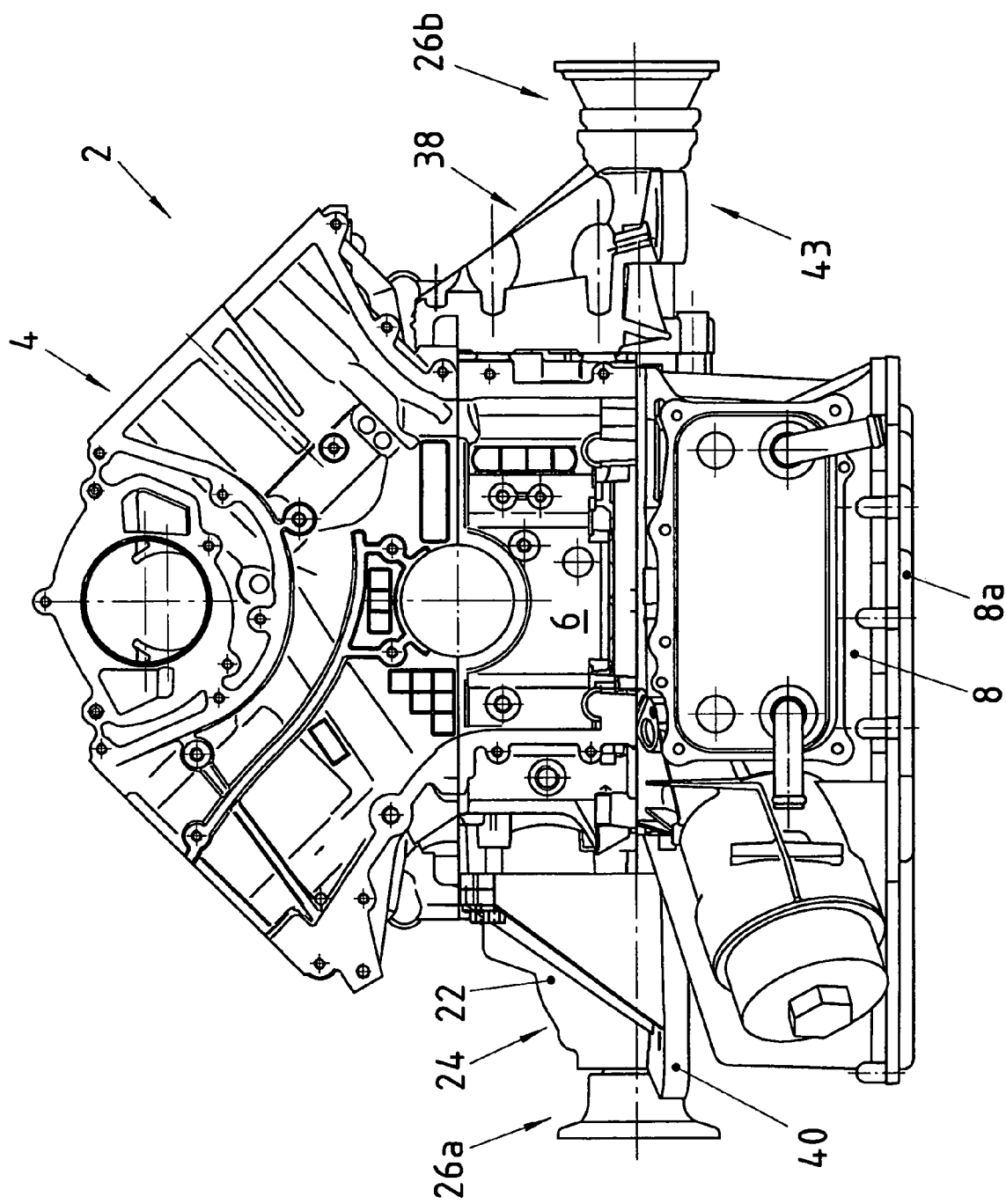
FIG. 4 is a first frontal view of the engine unit.

As illustrated in FIGS. 1 and 4, a first fastening flange 40 is shaped in one piece out of the housing 22 of the axle differential 24. The first fastening flange 40 is used for fastening the engine unit 2 to the chassis or body of the motor vehicle. On the opposite side, a second fastening flange 43 is provided on the bearing console and is used as a second bearing point for the fastening of the crankcase 2. Here, for example, the engine unit is linked to the chassis or the vehicle body by corresponding hydraulic bearings or the like.

In the illustrated exemplary embodiment, the motor vehicle equipped with the engine unit 2 is constructed as an all-wheel drive vehicle. For this purpose, the housing 22 of the axle differential 24 has a connection flange 41 in which a shaft is received 42 with the bevel drive pinion for the ring gear 36, while the other end of the shaft 42 leads to the transfer case.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Drive unit for a motor vehicle, comprising an engine unit, an axle differential arranged on the engine unit, having drive shafts for vehicle wheels disposed at least partially in a crankcase of the engine unit, a separating plane defined between a crankcase bottom part and an oil bearing housing of the crankcase provided to constitute a bearing plane for at least one of the drive shafts, and an opening that intersects the separating plane and is defined on both the crankcase bottom part and the oil bearing housing of the crankcase such that the at least one drive shaft is disposed within the opening.

2. Drive unit according to claim 1, wherein the housing of the axle differential includes a fastening flange configured as a bearing point for the crankcase.

3. Drive unit according to claim 1, wherein on a side of the crankcase situated opposite the axle differential, one of the drive shafts is additionally supported by a bearing console operatively secured to the crankcase.

4. Drive unit according to claim 2, wherein on a side of the crankcase situated opposite the axle differential, one of the drive shafts is additionally supported by a bearing console operatively secured to the crankcase.

5. Drive unit according to claim 3, where the bearing console has a fastening flange configured as a second bearing point for the crankcase.

6. Drive unit according to claim 5, wherein the housing of the axle differential includes a fastening flange configured as a bearing point for the crankcase.

* * * * *